Dec. 28, 1948.  J. R. LOCKER  2,457,387
CONVEYANCE OF FLUENT MATERIALS
Filed April 21, 1945  2 Sheets-Sheet 1

INVENTOR:
James R. Locker.
By Attorney: Walter Gunn.

Dec. 28, 1948.   J. R. LOCKER   2,457,387
CONVEYANCE OF FLUENT MATERIALS
Filed April 21, 1945   2 Sheets-Sheet 2

INVENTOR:
James R. Locker,
By Attorney: Walter Gunnw

Patented Dec. 28, 1948

2,457,387

UNITED STATES PATENT OFFICE 2,457,387

CONVEYANCE OF FLUENT MATERIALS

James Reginald Locker, Warrington, England

Application April 21, 1945, Serial No. 589,660
In Great Britain August 25, 1943

3 Claims. (Cl. 198—218)

In the conveyance of powdered, granular and like fluent materials it is a common practice to employ a vibrating conveyor, fed by a hopper or the like, not only because the vibrations provide a means of propulsion of the materials, but because it is an easy matter to vary the rate of propulsion by varying the amplitude of the vibrations. Usually, an electro-magnetic vibrator is employed, and the variation of amplitude can be effected by varying the current fed to the vibrator (as by introducing and removing impedances or resistances), which can be done for example by the mere turning of a knob. Other means of control are sometimes adopted, as alternatives.

However, there are many instances where this method of conveying by vibration, as hitherto known, is not useful. For example, there are materials such as slurry, sludges and thick pastes such as zinc oxide or titanium oxide which do not respond to the vibrations of the conveyor and therefore do not travel along the conveyor. Again, there are some finely-powdered materials, such as dry cement and hydrated lime, which are very free-flowing and which will over-run the conveyor, even if stationary, and are therefore not amenable to any control of the rate of flow. Also, vibrating conveyors as hitherto known are not adapted to the handling of thin liquids such as water, and some of the more mobile chemical fluids.

The present invention consists in the application of a new principle of conveying materials by vibration, which is free from the above limitations and which, furthermore, allows of the lifting as well as the driving of the materials.

According to the invention a vibrating wall or diaphragm, working at high frequency and with small amplitude (such as is obtainable with an electro-magnetic vibrator), is arranged in a closed chamber (closed except for inlet and outlet ports) and is caused to operate on the material as a pump, to draw the material through an inlet by its vibratory movements in one direction and to expel the material through an outlet by its vibratory movements in the opposite direction. Naturally, care will be taken to prevent a return of the material back through the inlet as the vibrating member makes its expulsion stroke, and to prevent a return of the material back through the outlet as the vibrating member makes its suction stroke, and this prevention may be effected by means of non-return valves in the inlet and/or outlet, or by regulating the relative sizes of the inlet and outlet, and their relative positions with respect to each other and to the direction of movement of the vibrating member or, so far as the inlet is concerned, by maintaining a sufficient head of material outside the inlet. The selection and effectiveness of these several alternatives for any particular case will depend largely upon the viscosity or mobility of the material concerned.

In vibrating conveyors as hitherto known, the fluent material has been in an open stream on the conveyor, and the particles in the stream have been in a constant "dance" on the conveyor, due to the successive upward impulses imparted to them. The reason why liquids and pastes have not responded to a vibrating conveyor is probably that their individual particles (whether discrete as in a powder or molecular as in a liquid) have not been sufficiently free from each other to "dance." The present invention does not require any such free movement of the conveyed particles. In a conveyor according to this invention, the material is not in an open stream, at least where the vibrating impulses are imparted to it, but is in and fills a closed chamber into and from which it is drawn and expelled by the vibrating diaphragm.

In the preferred embodiments of the invention, the vibrating member is a diaphragm forming an end wall of a tube, the outlet is larger than the inlet and is directly opposite the diaphragm so that the expelled material receives the full force of the inward movements of the diaphragm, and the inlet is in the top wall of the tube so as to receive as little effect as possible from the inward movements of the diaphragm, but so that the material is assisted into the tube by its own weight during the outward movements of the diaphragm. A useful rate of vibration for the diaphragm is that obtained with an electro-magnetic vibrator working on an ordinary 50-cycle single phase alternating current. This will give 3,000 inward movements and 3,000 outward movements of the diaphragm per minute.

It is found that with an arrangement of this kind, for thick pasty materials, such as a zinc oxide paste it is not necessary to have any valves either in the inlet or outlet, the viscous nature of the material providing a sufficient resistance to return movement through the inlet, provided a reasonable head of material is maintained outside the inlet.

Vibrating conveyors are sometimes required to advance the materials up an incline. The present invention lends itself readily to this requirement, and it has been found that the materials can be advanced along a rising conveyor, provided there is a greater head of material behind the inlet than that on the conveyor, so that, at the inlet there is a natural tendency for the material to flow in rather than out.

The present invention is applicable to the conveyance of liquids as well as solids, including both dry and moist solids, and to pastes as well as to powders.

The accompanying drawing illustrates two typical examples of the invention:

Figure 1:
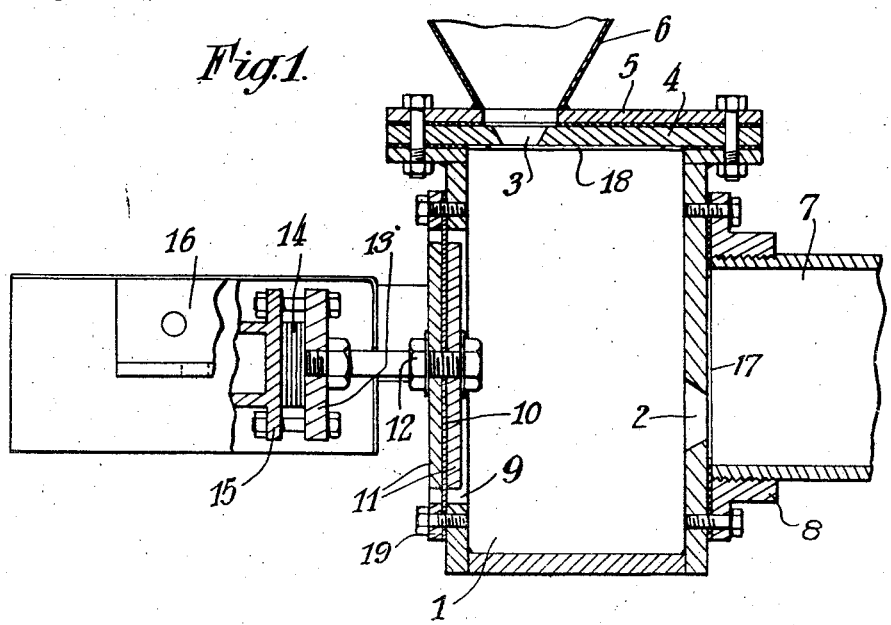
Fig. 1 is a part-sectional vertical elevation of one form of the invention adapted for conveying slurry and thick pastes.
Figure 2:
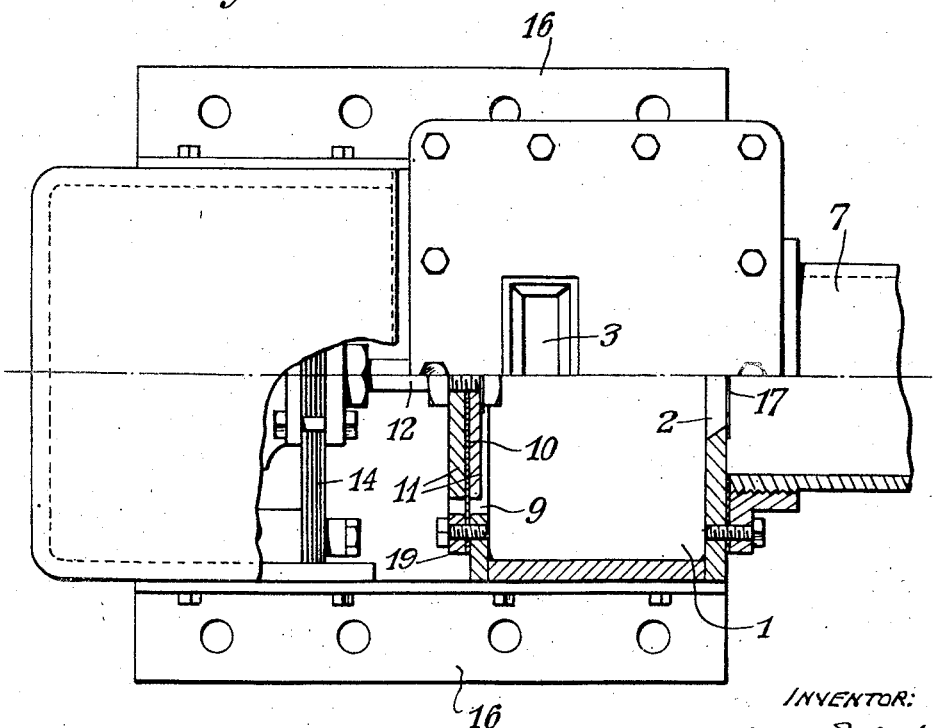
Fig. 2 is a part-sectional plan of the same.
Figure 3:
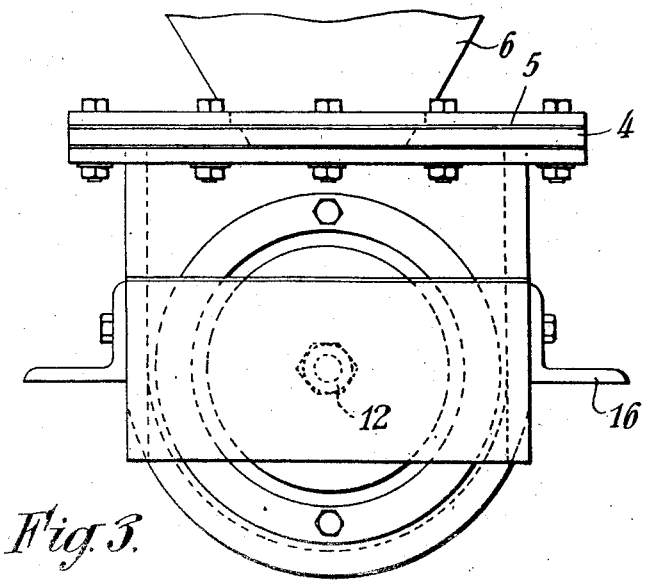
Fig. 3 is a rear elevation.

Referring first to Figs. 1, 2 and 3 there is a chamber 1 having an outlet 2 and an inlet 3, the inlet being in an interchangeable plate 4 sandwiched between the flanged upper edge of the chamber 1 and the closure plate 5, which last is attached to the outlet end of a feed hopper 6. Surrounding the outlet 2 is the delivery conduit 7 secured in a flanged ring 8, which is bolted against the side face of the chamber 1. If desired an interchangeable orifice plate may be provided between the chamber and the ring 8. In the side face of the chamber 1 opposite the outlet 2, is a large orifice 9, closed by a steel diaphragm 10, which is clamped between plates 11 carried by the bolt 12 extending from an armature 13. This armature is mounted on leaf springs 14 in the frame of an electro-magnetic vibrator 15 of known form, the frame of the vibrator and the container 1 being connected together by angle members 16, which also provide a means for the securing of the complete device to any convenient support (not shown).

This form of the invention is especially adapted for the conveyance of viscous materials, for example zinc oxide paste. The relative sizes of the outlet 2 and inlet 3 and the height of the hopper 6 can be such that, with a sufficient head of material in the hopper, no valves are required for the inlet and outlet. The inertia of the paste prevents any reverse movement of the paste at the inlet and outlet as the diaphragm vibrates, whereas the weight of material in the hopper brings about a feed movement into the chamber as the diaphragm moves outwards. Moreover, owing to the difference of position of the inlet and outlet with respect to the diaphragm, there is less resistance to an expulsion movement of the material through the outlet than through the inlet. For some materials, however, non-return valves may be necessary and these may be in the form of flap valves as indicated diagrammatically at 17 and 18.

In this example, the magnet (not shown) is a two-coil magnet fed with a 50-cycle single-phase alternating current (with or without an admixture of direct current), the motor giving 6,000 movements of the diaphragm per minute, three-thousand in the inward direction and three-thousand in the reverse direction.

Figure 4:
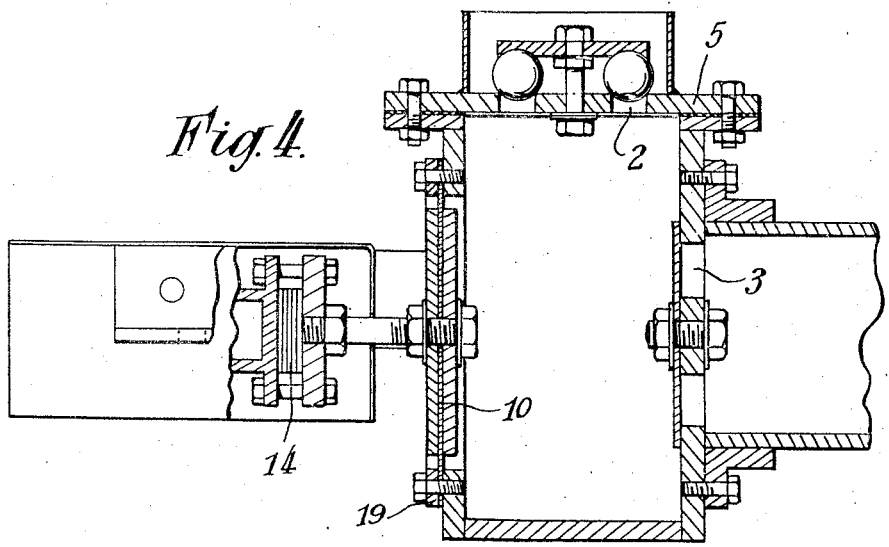
Fig. 4 is a view similar to Fig. 1, but showing another form of the invention, adapted for raising thin liquids.

Referring now to Fig. 4, a form of the invention is shown adapted for raising water and other thin liquids. In this case, the inlet 3 is in the side of the container opposite the diaphragm 10, whilst the outlet 2 (or multiple form) is in the top closure plate 5 of the container. Both the inlet and outlet are provided with non-return valves, the valve over the inlet being a diaphragm flap valve whilst at the outlet there are two spring-loaded ball valves. The construction of the vibrating diaphragm and of the vibrating mechanism are identical with that shown in Figs. 1 to 3.

In both examples, the steel diaphragm 10 is held in place by a peripheral clamping ring 19 by the removal of which and of the bolt 12, access may be had to the interior of the chamber 1 for inspection and cleaning purposes. As will be seen from Figs. 1 and 4, the diaphragm is held between the plates 11 over a large part of its surface, the flexure taking place between the edges of such plates and the clamping ring 17.

What I claim is:

1. An apparatus for the conveyance of viscous pasty materials such as zinc oxide paste comprising a closed chamber of rectangular section having an inlet port of restricted area in its top wall and an outlet port of slightly larger area in one of its side walls, a diaphragm in and forming a part of the opposite side wall of the chamber, electro-magnetic means exterior to said chamber and connected with said diaphragm for vibrating the same, a hopper located above the chamber and discharging through said inlet port, the inlet and outlet ports being both subject to the vibrations set up by the diaphragm and the material entering the chamber under its own weight and through the effect of the outward movement of the diaphragm and passing out of the chamber because of the larger area of the outlet port and the effect of the inward movement of the diaphragm.

2. An apparatus for the conveyance of viscous pasty materials such as zinc oxide paste comprising a chamber of rectangular section provided at the top with a plate having an inlet port of restricted area, said chamber having an outlet port of slightly larger area in one of its side walls and provided in the opposite side wall with a vibratory diaphragm, means for detachably securing said plate to the chamber whereby said plate may be removed for permitting plates having inlet ports of different sizes to be employed, electro-magnetic means exterior to the chamber and connected with the diaphragm for vibrating the same, and a hopper located above the chamber and discharging through the inlet port, the inlet and outlet ports both being subject to the vibrations set up by the diaphragm and the material entering the chamber under its own weight and through the effect of the outward movement of the diaphragm and passing out of the chamber because of the larger area of the outlet port and the effect of the inward movement of the diaphragm.

3. An apparatus for the conveyance of viscous pasty materials such as zinc oxide paste, comprising a closed chamber of rectangular section having an inlet port of restricted area in its upper wall and provided in one of its side walls with an outlet port of slightly larger area, a circular diaphragm in the opposite side wall of the chamber, metal plates located at the opposite faces of the diaphragm and clamping the same for a substantial part of its area, electro-magnetic means exterior to the chamber and connected with said metal plates for vibrating the diaphragm, and a hopper located above the chamber and discharging through the inlet port, the inlet and outlet ports both being subject to the vibrations set up by the diaphragm, and the material entering the chamber under its own weight and through the effect of the outward movement of the diaphragm and passing out of the chamber because of the larger area of the outlet port and the effect of the inward movement of the diaphragm.

JAMES REGINALD LOCKER.

REFERENCES CITED

The following references are of record in the file of this patent:

UNITED STATES PATENTS

| Number | Name | Date |
| --- | --- | --- |
| 1,080,602 | Stokes | Dec. 9, 1913 |
| 1,802,945 | Hood | Apr. 28, 1931 |
| 2,094,787 | Flint | Oct. 5, 1937 |
| 2,253,206 | Farrow | Aug. 19, 1941 |
| 2,312,712 | Hartline | Mar. 2, 1943 |

FOREIGN PATENTS

| Number | Country | Date |
| --- | --- | --- |
| 670,018 | Germany | 1939 |